(12) United States Patent
Yamawaki et al.

(10) Patent No.: US 9,031,752 B2
(45) Date of Patent: May 12, 2015

(54) DEVICE FOR CONTROLLING AUTOMATIC TRANSMISSION

(71) Applicant: JATCO Ltd, Fuji-shi, Shizuoka (JP)

(72) Inventors: Morimasa Yamawaki, Tokyo (JP);
Tatsuya Hayashi, Tokyo (JP)

(73) Assignee: JATCO Ltd, Fuji-Shi (JP)

( * ) Notice: Subject to any disclaimer, the term of this patent is extended or adjusted under 35 U.S.C. 154(b) by 0 days.

(21) Appl. No.: 14/358,465

(22) PCT Filed: Nov. 16, 2012

(86) PCT No.: PCT/JP2012/079725
§ 371 (c)(1),
(2) Date: May 15, 2014

(87) PCT Pub. No.: WO2013/073646
PCT Pub. Date: May 23, 2013

(65) Prior Publication Data
US 2014/0332333 A1 Nov. 13, 2014

(30) Foreign Application Priority Data

Nov. 18, 2011 (JP) .................................. 2011-253109

(51) Int. Cl.
*G06F 7/00* (2006.01)
*F16D 33/18* (2006.01)
*F16H 61/14* (2006.01)
*F16D 48/06* (2006.01)

(52) U.S. Cl.
CPC .............. *F16D 33/18* (2013.01); *F16H 61/143* (2013.01); *F16H 2061/145* (2013.01); *F16D 48/06* (2013.01)

(58) Field of Classification Search
CPC . F16H 61/14; F16H 61/143; F16H 2061/145; F16H 2061/146; F16D 48/06; B60W 10/026; B60W 2510/0233; B60W 2510/0241; B60W 2510/025; B60W 2510/0275; B60W 2510/0291; B60W 2710/024; B60W 2710/025; B60W 2710/026; B60W 2710/027; B60W 2710/029
See application file for complete search history.

(56) References Cited

U.S. PATENT DOCUMENTS 5,683,329 A * 11/1997 Kono et al. .................... 477/176
5,807,204 A * 9/1998 Shiiba et al. .................. 477/176
6,050,919 A 4/2000 Kusafuka et al.
(Continued)

FOREIGN PATENT DOCUMENTS

JP 09-060721 A 3/1997
JP 10-325460 A 12/1998
(Continued)

*Primary Examiner* — David D Le
(74) *Attorney, Agent, or Firm* — Foley & Lardner LLP

(57) ABSTRACT

A device for controlling an automatic transmission including a lock-up clutch control portion and a zero slip control portion for bringing a lock-up clutch into a zero slip state immediately before slippage occurs in accordance with a zero slip request outputted during a non-gear shift, wherein in a case where a target slip amount is equal to or smaller than a slip amount threshold value upon transition to the zero slip state, the zero slip control portion fixes the target slip amount to the slip amount threshold value and retains the fixed target slip amount for a predetermined period of time, and after the predetermined period of time has elapsed, gradually decreases the target slip amount from the slip amount threshold value to a zero slip amount with a predetermined gradient with time.

6 Claims, 3 Drawing Sheets

(56) References Cited

U.S. PATENT DOCUMENTS

| | | | |
|---|---|---|---|
| 6,482,126 B2 * | 11/2002 | Kawaguchi | 477/180 |
| 8,219,295 B2 | 7/2012 | Oue et al. | |
| 8,924,112 B2 * | 12/2014 | Ayabe et al. | 701/68 |
| 2009/0248266 A1 | 10/2009 | Oue et al. | |
| 2009/0312925 A1 * | 12/2009 | Oue et al. | 701/58 |
| 2010/0145584 A1 * | 6/2010 | Kojima | 701/68 |
| 2011/0264344 A1 * | 10/2011 | Yamawaki | 701/68 |

FOREIGN PATENT DOCUMENTS

| | | |
|---|---|---|
| JP | 2004-324847 A | 11/2004 |
| JP | 2009-243533 A | 10/2009 |
| JP | 2009-275858 A | 11/2009 |

\* cited by examiner

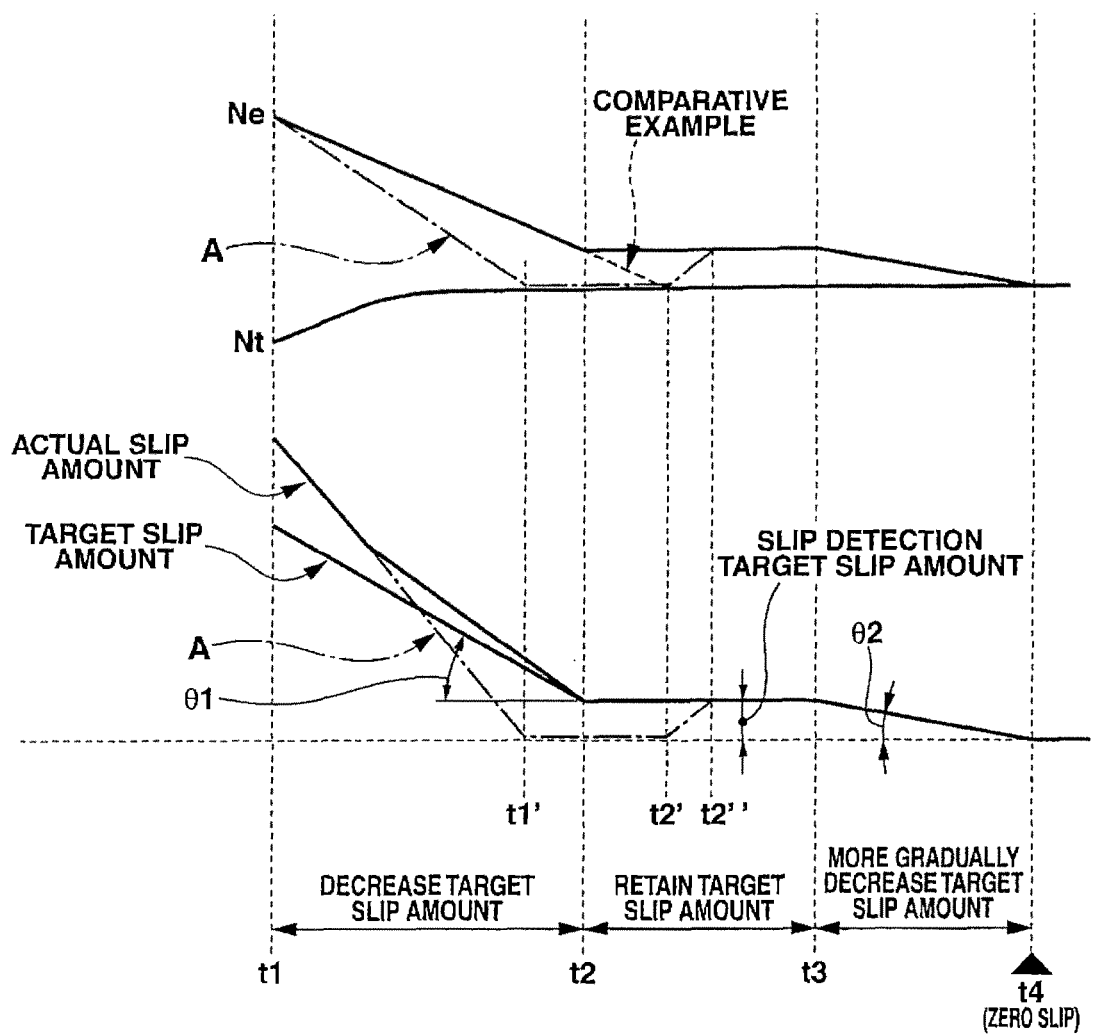

DEVICE FOR CONTROLLING AUTOMATIC TRANSMISSION

TECHNICAL FIELD

The present invention relates to a device for controlling an automatic transmission which brings a lock-up clutch into a zero slip state immediately before a slippage occurs in the lock-up clutch in preparation for quick transition to slip lock-up control.

BACKGROUND ART

In general, during a gear shift, such feedback control to a predetermined differential rotation is conducted to slip a lock-up clutch (so-called slip lock-up control) and thereby suppress a shift shock.

On the other hand, upon a non-gear shift, except for the case where a large driving force is required, engagement of the lock-up clutch is carried out to thereby eliminate slippage in a torque converter and improve fuel economy, as generally performed.

Further, in recent years, with the progress of a multi-stage configuration of an automatic transmission, a gear shift is frequently carried out. Therefore, in order to instantaneously execute the slip lock-up control, in a case where slippage of the lock-up clutch is not necessary, for instance, upon the non-gear shift, control of a lock-up engagement capacity is also carried out such that the lock-up clutch is brought into a state immediately before slippage occurs (hereinafter referred to as a zero slip state) (for instance, see Patent Literature 1).

However, for the reasons described below, it is significantly difficult to control the lock-up engagement capacity such that the lock-up clutch is brought into the state immediately before slippage occurs (the zero slip state). There is a problem that when during the non-gear shift, the lock-up clutch is brought into a state in which the lock-up clutch has a capacity larger than necessary (a substantially engagement state), a start of the slip lock-up control during a gear shift is delayed so that a shift shock is caused.

(a) The zero slip state is a state in which engine rotation speed Ne and turbine rotation speed Nt are equal to each other. By detecting the rotation speed, it is recognized that there occurs no clutch slippage. However, the mere detection of the rotation speed is insufficient to determine whether the lock-up engagement capacity is excessively large or the lock-up engagement capacity is appropriate.

(b) Although as generally performed, when transition of the lock-up clutch from the release state to the engagement state is carried out, feedback control is performed while gradually reducing a target slip amount of the lock-up clutch, it is difficult to control actuation (initiation) of a mechanism of the lock-up clutch because a return spring is not used in the mechanism of the lock-up clutch. For instance, when the lock-up clutch is actuated, an inertia force is exerted on the lock-up clutch so that the lock-up clutch is occasionally allowed to mechanically move and come into the engagement state in a stage in which the target slip amount is still large.

(c) It is possible to estimate a timing at which the lock-up engagement capacity is started to generate to a certain extent by using engine torque Te, engine rotation speed Ne and the like ($Te-\tau Ne^2$). However, engine torque Te and engine rotation speed Ne suffer large influence of disturbance, and there is a delay in detection of engine torque Te and engine speed Ne. Therefore, it is significantly difficult to hold the lock-up clutch at the capacity immediately before the lock-up clutch starts to slip with high accuracy.

CITATION LIST

Patent Literature

Patent Literature 1: Japanese Patent Application Unexamined Publication No. 2009-243533

SUMMARY OF INVENTION

An object of the present invention is to provide a device for controlling an automatic transmission which is capable of controlling a lock-up engagement capacity such that a lock-up clutch is stably brought into a zero slip state immediately before slippage occurs simply by controlling a slip amount of the lock-up clutch.

In one aspect of the present invention, there is provided a device for controlling an automatic transmission including:

a torque converter disposed between a driving source of a vehicle and the automatic transmission;

a lock-up clutch disposed to enable a side of the drive source of the torque converter and a side of the automatic transmission to engage with each other;

a lock-up clutch control means for executing feedback control to conform an actual slip amount of the lock-up clutch with a target slip amount; and a zero slip control means for bringing the lock-up clutch into a zero slip state immediately before slippage occurs in accordance with a zero slip request outputted during a non-gear shift, wherein upon transition to the zero slip state, the zero slip control means fixes the target slip amount to a slip amount threshold value and retains the fixed target slip amount for a predetermined period of time, and after the predetermined period of time has elapsed, gradually decreases the target slip amount from the slip amount threshold value to a zero slip amount with time.

For instance, upon merely executing control to gradually reduce the target slip amount of the lock-up clutch to the zero slip amount with time, a mechanical motion of the lock-up clutch is caused due to an inertia force generated when the lock-up clutch having no return spring is actuated, so that the lock-up clutch is brought into engagement in a stage in which the target slip amount is still large.

In contrast, in the present invention, a mechanical motion of the lock-up clutch due to the inertia force is temporarily restrained by conducting the process of retaining the target slip amount while fixing the target slip amount to the slip threshold value, and the lock-up clutch is stably held in a slip state based on the slip threshold value. Specifically, the mechanical motion of the lock-up clutch can be restrained by temporarily retaining the lock-up clutch near the zero slip state (in a state in which the slip amount is slightly larger than in the zero slip state). After that, the lock-up clutch is brought into the stable zero slip state by gradually reducing the target slip amount. Accordingly, the lock-up clutch can be certainly brought into the zero slip state without being influenced by inertia of the lock-up clutch.

Thus, according to the present invention, it is possible to control a lock-up engagement capacity to stably bring the lock-up clutch into the zero slip state immediately before slippage occurs simply by controlling a slip amount of the lock-up clutch.

BRIEF DESCRIPTION OF DRAWINGS

FIG. 3 is a time chart showing respective characteristics of engine rotational speed (Ne), turbine rotational speed (Nt), actual slip amount and target slip amount which are provided when a lock-up clutch in a slip lock-up state is brought into a zero slip state by zero slip control according to the embodiment.

DESCRIPTION OF EMBODIMENTS

In the following, a device for controlling an automatic transmission according to an embodiment of the present invention is explained with reference to the accompanying drawings.

A configuration of the device for controlling an automatic transmission according to the embodiment is classified into "General System Configuration" and "Zero Slip Control Configuration", which are separately explained below.

[General System Configuration]

Figure 1:
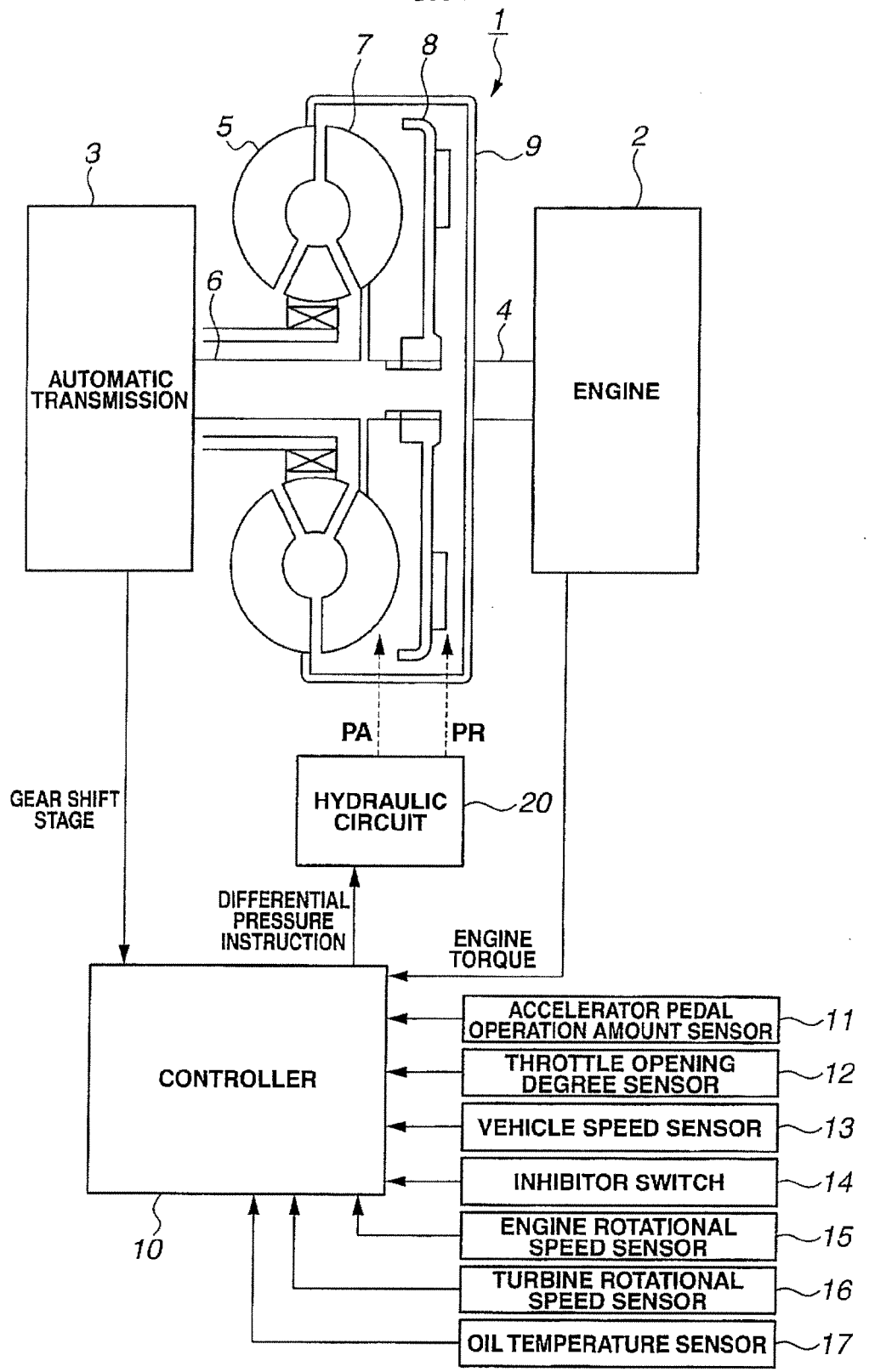
FIG. 1 is a general system diagram showing a configuration of an engine powertrain and a control system to which a device for controlling an automatic transmission according to an embodiment of the present invention is applied.

FIG. 1 is a general system diagram showing a configuration of an engine power train and a control system to which the device for controlling an automatic transmission according to the embodiment is applied. In the following, a general system configuration is explained with reference to FIG. 1.

As shown in FIG. 1, the engine power train to which the device for controlling an automatic transmission according to the embodiment is applied includes torque converter 1, engine 2 (drive source), automatic transmission 3, and lock-up clutch 8.

Torque converter 1 is disposed between engine 2 and automatic transmission 3, and transmits a driving force of engine 2 to automatic transmission 3 through a fluid. Torque converter 1 is arranged such that pump impeller 5 coupled to output shaft 4 of engine 2 and turbine runner 7 coupled to input shaft 6 of automatic transmission 3 are opposed to each other. When pump impeller 5 is rotated in accordance with rotation of engine 2, a transmission hydraulic oil (ATF) filled in an interior of torque converter 1 is flowed to thereby rotate turbine runner 7.

Lock-up clutch 8 is coupled to input shaft 6 of the transmission, and is rotated together with turbine runner 7. Lock-up clutch 8 is disposed on an inside of front cover 9 integral with pump impeller 5 which is coupled to output shaft 4 of engine 2. When lock-up clutch 8 is engaged with pump impeller 5, an input element and an output element of torque converter 1 are directly coupled to each other to interrupt relative rotation thereof and establish a full lock-up state thereof. Further, when the input element and the output element are brought into a semi-engaged state, a slip lock-up state in which slippage is generated between the input element and the output element is established. When lock-up clutch 8 is completely released from pump impeller 5, an unlock-up state is established.

Lock-up clutch 8 is actuated in accordance with a differential pressure between torque converter apply pressure PA and torque converter release pressure PR which act on both sides of lock-up clutch 8. When the release pressure PR is higher than the apply pressure PA, lock-up clutch 8 is released. When the release pressure PR is lower than the apply pressure PA, lock-up clutch 8 is engaged. Transmittable torque that can be transmitted by lock-up clutch 8 of torque converter 1 and depends on an engagement force of lockup clutch 8, that is, a lock-up engagement capacity is determined by the above-described differential pressure.

As shown in FIG. 1, the control system to which the device for controlling an automatic transmission according to the embodiment is applied includes controller 10, accelerator pedal operation amount sensor 11, throttle opening degree sensor 12, vehicle speed sensor 13, inhibitor switch 14, engine rotational speed sensor 15, turbine rotational speed sensor 16, oil temperature sensor 17, and hydraulic circuit 20.

Controller 10 calculates a target slip amount that is a target rotational speed difference between the input element and the output element of torque converter 1 (a difference between engine rotational speed Ne and turbine rotational speed Nt as targeted), and controls the differential pressure between the torque converter apply pressure PA and the torque converter release pressure PR. As the target slip amount is large, the differential pressure is controlled to become small to thereby reduce the engagement force of lock-up clutch 8. Controller 10 calculates the target slip amount of lock-up clutch 8 on the basis of engine torque. Further, controller 10 calculates a differential pressure command value by feedback control based on deviation between the target slip amount calculated and an actual slip amount (difference between the engine rotational speed Ne and the turbine rotational speed Nt), and instructs the differential pressure command value to hydraulic circuit 20 that controls an oil pressure to be supplied to lock-up clutch 8. Meanwhile, the zero slip control is not performed except for D range and M range.

[Zero Slip Control Configuration]

Figure 2:
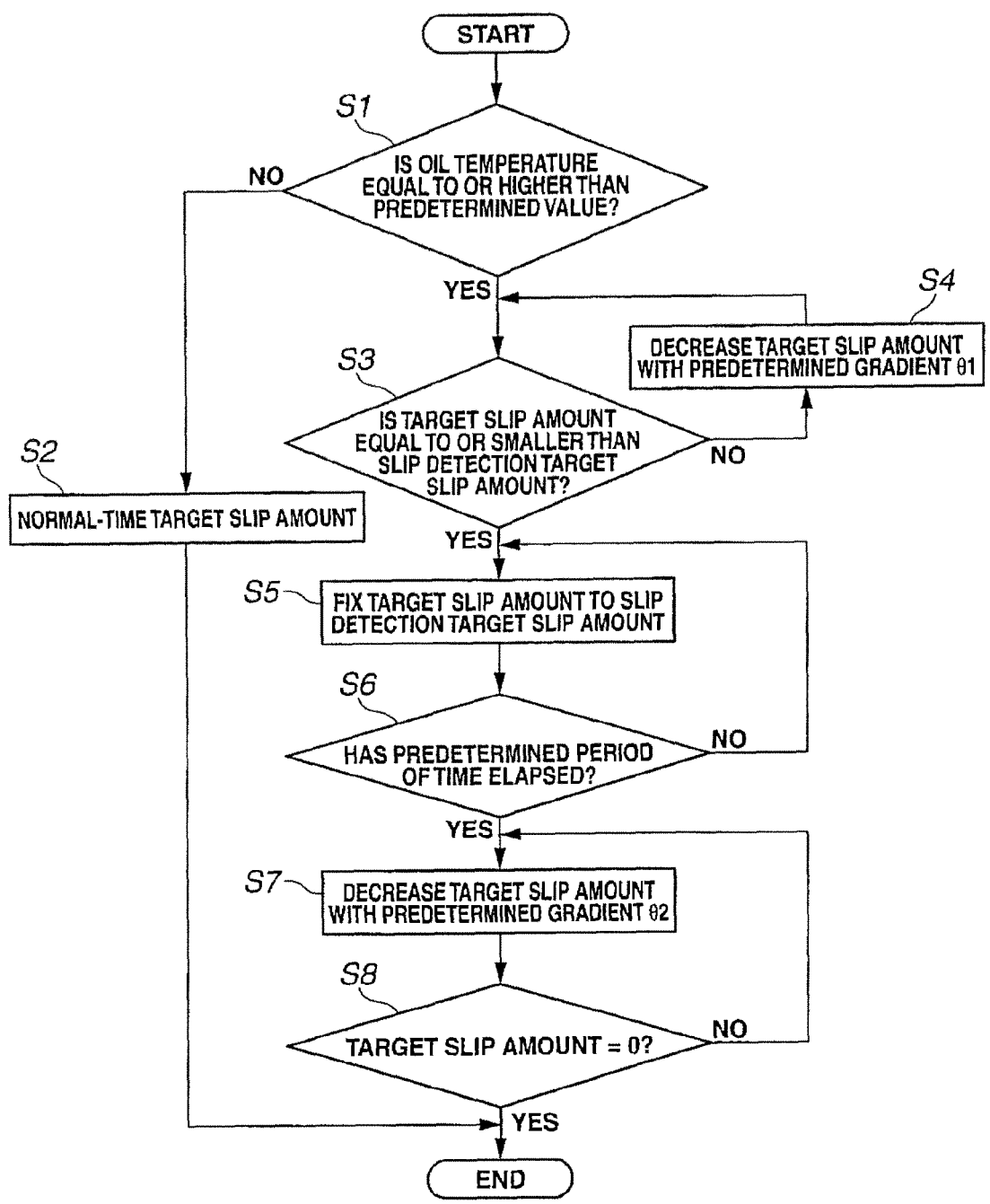
FIG. 2 is a flowchart showing a flow of a zero slip control process that is executed in a controller of the device for controlling an automatic transmission according to the embodiment.

FIG. 2 shows a flow of a zero slip control process (zero slip control means) that is executed in controller 10 of the device for controlling an automatic transmission according to the embodiment. Each step of FIG. 2 showing the zero slip control configuration will be explained hereinafter. Incidentally, this process is started by a zero slip request that is outputted when slippage of lock-up clutch 8 is not desired, for instance, during non-gear shift.

In step S1, it is determined whether or not an oil temperature of a transmission hydraulic oil (ATF) based on a sensor signal from oil temperature sensor 17 is equal to or higher than a predetermined value. When the answer in step S1 is YES (oil temperature≥predetermined value), the logic flow proceeds to step S3. When the answer in step S1 is NO (oil temperature<predetermined value), the logic flow proceeds to step S2. Here, the predetermined value is set to an oil temperature on a low temperature side at which controllability of lock-up clutch 8 is deteriorated, in consideration of a change in viscosity of the transmission hydraulic oil which depends on the oil temperature. That is, the predetermined value corresponds to an oil temperature at which it is difficult to carry out the zero slip control to bring lock-up clutch 8 into a zero slip state immediately before slippage occurs.

In step S2, based on the determination of the condition of oil temperature<predetermined value in step S1, the zero slip control is not executed, and a target slip amount according to a normal request, that is, a normal-time target slip amount is outputted. Then, the logic flow proceeds to END, and the routine of the zero slip control is finished.

In step S3, subsequent to the determination of the condition of oil temperature≥predetermined value in step S1, it is determined whether or not a target slip amount at the present time is equal to or smaller than a slip detection target slip amount (slip amount threshold value). When the answer in step S3 is YES, the logic flow proceeds to step S5. When the answer in step S3 is NO, the logic flow proceeds to step S4 in which the target slip amount is gradually decreased with a first target slip amount decrease gradient θ1. Then, the operation of the determination in step S3 is repeatedly executed.

Specifically, if the target slip amount is larger than the slip detection target slip amount when the zero slip control is started in accordance with a zero slip request, the target slip amount can be gradually decreased with the gradient θ1 by repeatedly executing the operation in step S3 and the operation in step S4.

Meanwhile, if the target slip amount is equal to or smaller than the slip detection target slip amount when the zero slip control is started in accordance with the zero slip request, the logic flow immediately proceeds to step S5.

In step S5, subsequent to the determination that the target slip amount at the present time is equal to or smaller than the slip detection target slip amount in step S3, the target slip amount is fixed to the slip detection target slip amount (the slip amount threshold value). Here, the slip detection target slip amount is a slip amount present in a region immediately before the zero slip state, and is set to a slip amount (for instance, about several ten rpm as differential rotation) which is detectable as an actual slip amount of lock-up clutch 8 (a difference between the engine rotational speed Ne and the turbine rotational speed Nt) by a sensor.

In step S6, it is determined whether a predetermined period of time has elapsed after the target slip amount is fixed to the slip detection target slip amount in step S5. In the present embodiment, it is determined that the predetermined period of time has elapsed when a condition that the actual slip amount is close to the target slip amount, i.e., the slip detection target slip amount, has continued for a predetermined time by a feedback control (not shown). Specifically, when a condition that the actual slip amount is equal to or larger than a predetermined a condition that value has continued for a predetermined time, the answer in step S6 is YES. The above criterion value is a value equal to or smaller than the slip detection target slip amount. For instance, if the slip detection target slip amount is about several ten rpm as differential rotation as described above, the above criterion value is set to a value slightly smaller than the slip detection target slip amount.

When the answer in step S6 is YES, the logic flow proceeds to step S7. When the answer in step S6 is NO, the logic flow goes back to step S5. That is, through step S5 and step S6, the condition that the target slip amount is fixed to the slip detection target slip amount is maintained, and after the actual slip amount is retained close to the slip detection target slip amount for the predetermined time, the logic flow proceeds to step S7.

In step S7, the target slip amount is gradually decreased with a second target slip amount decrease gradient θ2 (however, θ2<θ1).

In step S8, it is determined whether or not the target slip amount decreased with a second target slip amount decrease gradient θ2 has reached the target slip amount 0 (zero slip state). When the answer in step S8 is YES (target slip amount=0), the logic flow proceeds END and the routine of the zero slip control is finished. When the answer in step S8 is NO (target slip amount≠0), the logic flow goes back to step S7 and decrease of the target slip amount is repeated. That is, through step S7 and step S8, the target slip amount is gradually decreased from the slip detection target slip amount to 0 (zero slip state) with a second target slip amount decrease gradient θ2.

Next, an operation of the device for controlling an automatic transmission according to the embodiment is classified into "Zero Slip Control Operation by Target Slip Amount Control", "Zero Slip Control Operation in Case of Clutch Engagement in Early Stage" and "Zero Slip Control Prohibition Operation in Low Oil Temperature Condition" which are separately explained below.

[Zero Slip Control Operation by Target Slip Amount Control]

As described above, it is significantly difficult to control the lock-up engagement capacity such that the lock-up clutch is brought into the zero slip state immediately before slippage occurs. However, in order to promptly start the slip lock-up control upon a gear shift, it is necessary to previously control the lock-up engagement capacity close to a limit thereof (zero slip state) during a non-gear shift. Here, the zero slip state immediately before slippage of the lock-up clutch occurs means a state in which the lock-up engagement capacity is controlled to a value smaller than a maximum value of the lock-up engagement capacity and controlled such that a difference from a lock-up engagement capacity at which the lock-up clutch begins to slip falls in a predetermined range. Incidentally, in the present embodiment, the lock-up engagement capacity is controlled to be within the predetermined range by controlling the target slip amount of the lock-up clutch to substantially zero by the feedback control. However, the lock-up engagement capacity may be controlled to be within the predetermined range by learning control or the like. In the following, the zero slip control operation by target slip amount control is explained with reference to FIG. 2 and FIG. 3.

During such a non-gear shift, etc., when a zero slip request is outputted and the oil temperature is equal to or higher than a predetermined value, the logic flow in the flowchart of FIG. 2 proceeds from step S1 to step S3 and thereafter the zero slip control is substantially started. When the zero slip control shown in the flowchart of FIG. 2 is started, usually the target slip amount is larger than the slip detection target slip amount. Therefore, by repeating step S3 and step S4, the target slip amount is gradually decreased with the first target slip amount decrease gradient θ1 as shown in FIG. 3.

Then, when it is determined that the target slip amount is equal to or smaller than a predetermined slip detection target slip amount in step S3, the target slip amount is fixed to the slip detection target slip amount in step S5, and retained for a predetermined period of time (t2-t3 in FIG. 3). In step S6, based on the actual slip amount, it is determined that the predetermined period of time has elapsed.

Incidentally, at such a time immediately after piston stroke control is finished (in other words, immediately after engagement of lock-up clutch 8), when the zero slip control shown in the flowchart of FIG. 2 is started in accordance with the zero slip request, the target slip amount might be already smaller than the slip detection target slip amount. In such a case, the target slip amount is set to the slip detection target slip amount in step S5, so that the target slip amount in an initial stage which is smaller than the slip detection target slip amount is contrarily increased toward the slip detection target slip amount. Thus, the slip detection target slip amount is retained for the predetermined period of time.

Then, when the condition of the retention period of time in step S6 is satisfied, the operations of step S7 and step S8 shown in the flowchart of FIG. 2 are repeatedly executed. As a result, the target slip amount is gradually decreased with the second target slip amount decrease gradient θ2 (<the first target slip amount decrease gradient θ1). When the condition of target slip amount=0 is satisfied in step S8, the serial control is finished. By thus retaining the clutch engagement capacity when the condition of target slip amount=0 is satisfied, lock-up clutch 8 is brought into the zero slip state (t3-t4 in FIG. 3).

Accordingly, when bring lock-up clutch 8 into the zero slip state, as shown in FIG. 3, in a first stage from time t1 to time t2, the control to gradually decrease the target slip amount of lock-up clutch 8 with the first target slip amount decrease gradient θ1 with time is executed. In the first stage, the actual slip amount is deviated with respect to the target slip amount at time t1. As it approaches time t2, an amount of deviation between the actual slip amount and the target slip amount is decreased, and at time t2, the actual slip amount and the target slip amount become substantially equal to each other.

Then, when the target slip amount reaches the slip detection target slip amount as the slip amount threshold value at time t2, a second stage is started, in which the control to retain the target slip amount while fixing the target slip amount to the slip detection target slip amount for the predetermined period of time is executed. In the second stage, the target slip amount and the actual slip amount remain to be substantially equal to the slip detection target slip amount.

Then, at time t3 at which the predetermined period of time has elapsed, a third stage is started, in which the control to gradually decrease the target slip amount from the slip detection target slip amount to the zero slip amount with the second target slip amount decrease gradient θ2 with time is executed. In the third stage, the target slip amount and the actual slip amount which are kept equal to each other are gradually decreased from time t3, and the target slip amount becomes zero at time t4.

For instance, in a comparative example in which control to merely decrease the target slip amount of the lock-up clutch to a zero slip amount with time is executed, as shown in a characteristics indicated by dotted line in FIG. 3, the lock-up clutch is mechanically moved due to an inertia force that acts on the lock-up clutch when the lock-up clutch having no return spring is actuated, so that the lock-up clutch tends to come into the engaged state in a stage in which the target slip amount is still large.

In contrast, by interposing the control to retain the target slip amount while fixing the target slip amount to the slip detection target slip amount for the predetermined period of time which is executed in the second stage from time t2 to time t3, a mechanical movement of lock-up clutch 8 due to the inertia force is temporarily restrained so that lock-up clutch 8 is stabilized in a slip state established by the slip detection target slip amount. That is, regardless of the control in the first stage from time t1 to time t2, in the second stage from time t2 to time t3, a state of lock-up clutch 8 is converged to a stable slip state in which the mechanical movement of lock-up clutch 8 is restrained. Accordingly, by executing the control to gradually shift from the stable slip state in the second stage from time t2 to time t3 toward the zero slip amount in the third stage from time t3 to time t4, the lock-up engagement amount can be controlled such that lock-up clutch 8 is surely brought into the zero slip state immediately before slippage occurs.

As described above, in this embodiment, the zero slip control is constituted of three stages including the first stage to the third stage, and it is possible to control the lock-up engagement capacity to bring lock-up clutch 8 into the zero slip state immediately before slippage occurs simply by controlling the slip amount (target slip amount and actual slip amount) of lock-up clutch 8.

In the embodiment, the slip detection target slip amount as the slip amount threshold value is set to the slip amount that is present in a region immediately before the zero slip state and detectable as the actual slip amount of lock-up clutch 8 by a sensor.

Accordingly, while retaining the target slip amount at the slip detection target slip amount, it is possible to surely control the actual slip amount by sensor detection and stably bring the lock-up clutch into the zero slip state by setting the slip amount threshold value to the slip amount present in the region immediately before the zero slip state.

In the embodiment, when a condition that the actual slip amount is present close to the slip detection target slip amount (a condition that the actual slip amount is equal to or larger than the predetermined criterion value) continues the predetermined time, it is determined that the predetermined period of time has expired (step S6). Accordingly, when the target slip amount is fixed to the slip detection target slip amount as a slip amount threshold value and convergence to the stable slip state is confirmed, the control to gradually decrease the target slip amount to the zero slip amount can be executed.

In the embodiment, the second target slip amount decrease gradient θ2 used after the target slip amount is retained for the predetermined period of time is set to be smaller than the first target slip amount decrease gradient θ1 used until the target slip amount reaches the slip detection target slip amount.

Accordingly, it is possible to ensure a response capability with respect to decrease of the target slip amount in the first stage up to retaining the target slip amount, and after retaining the target slip amount, it is possible to surely attain the zero slip state with high accuracy in the third stage.

[Zero Slip Control Operation in Case of Clutch Engagement in Early Stage]

As described above, the present invention is not an exception on such a point that when the lock-up clutch without a return spring is actuated, the lock-up clutch is caused to mechanically move due to an inertia force that acts to the lock-up clutch. However, the zero slip control of the embodiment is also a countermeasure to a case where clutch engagement occurs in an early stage. In the following, the zero slip control in a case where clutch engagement occurs in an early stage will be explained with reference to FIG. 3.

When the zero slip control is started at time t1 in FIG. 3, the target slip amount is gradually decreased, and lock-up clutch 8 is caused to mechanically move due to the inertia force acting on lock-up clutch 8. At this time, as shown in an actual slip amount characteristics as indicated by dashed line A, the actual slip amount is decreased with a rapid decrease gradient. In this case, at time t1' before time t2 at which the target slip amount reaches the slip detection target slip amount, the actual slip amount becomes zero, that is, lock-up clutch 8 is brought into the lock-up engagement state.

However, at time t2 at which the target slip amount reaches the slip detection target slip amount, thereafter, the target slip amount is fixed to the slip detection target slip amount in accordance with the process according to the flowchart of FIG. 2. Therefore, lock-up clutch 8 is held in the lock-up engaged state from time t1' to time t2' (time obtained by adding a response delay time to time t2), and lock-up clutch 8 starts to slip at time t2' and the actual slip amount reaches the target slip amount (=slip detection target slip amount) at time t2" (that is, the actual slip amount becomes equal to or larger than the predetermined criterion value).

Accordingly, after time t2", returning to the zero slip control similar to the case where clutch engagement does not occur in an early stage, the stable slip state of lock-up clutch 8 in the second stage is held. Then, at a time at which the condition that the actual slip amount is close to the slip detection target slip amount as the target slip amount (specifically, the condition that the actual slip amount is equal to or larger than the predetermined criterion value) continues for the predetermined time, the second stage is shifted to the third stage. In the third stage, the control to gradually decrease the target slip amount to the zero slip amount is executed, so that the lock-up engagement capacity is controlled to surely bring lock-up clutch 8 into the zero slip state immediately before slippage occurs.

Since the zero slip control is thus executed based on control of the target slip amount, even in a case where lock-up engagement of lock-up clutch 8 occurs in early stage, it is possible to appropriately bring lock-up clutch 8 into the zero slip state. This means that in the zero slip control, the control to lead to the zero slip state can be attained without being influenced by the slit control in the first stage.

[Zero Slip Control Prohibition Operation in Low Oil Temperature Condition]

As described above, in the zero slip control, the control to retain a small slip amount is executed in the second stage. Therefore, when a condition for retaining the small slip amount is not satisfied, there will occur deterioration of zero slip controllability on the contrary. Accordingly, when the condition for retaining the small slip amount is not satisfied, it is necessary to prohibit the zero slip control. In the following, a zero slip control prohibition operation in a low oil temperature condition will be explained with reference to FIG. 2.

The zero slip control is started by a zero slip request. In a case where the oil temperature of the transmission hydraulic oil (ATF) which is based on a sensor signal from oil temperature sensor 17 is lower than the predetermined value, the logic flow in the flowchart of FIG. 2 proceeds from step S1 through step S2 to END. That is, in a case where the oil temperature of the transmission hydraulic oil is as low as controllability of lock-up clutch 8 is deteriorated due to a change in viscosity of the transmission hydraulic oil which depends on the oil temperature, the normal-time target slip amount is outputted in step S2 so that a differential pressure instruction corresponding to the normal-time target slip amount is outputted to lock-up clutch 8.

Specifically, when the oil temperature is low, a friction characteristic of lock-up clutch 8 is deteriorated. For instance, in a case where a lock-up capacity is reduced by a predetermined amount when the oil temperature is low, slippage of lock-up clutch 8 becomes large as compared to the case where the oil temperature is high. Thus, the controllability of lock-up clutch 8 is deteriorated. Therefore, in the above embodiment, when the oil temperature is low, substantially no zero slip control is executed. As a result, it is possible to suppress deterioration in controllability of lock-up clutch 8 such as a delay of engagement of lock-up clutch 8.

The device for controlling an automatic transmission according to the embodiment can attain the following effects.

(1) When bringing lock-up clutch 8 into a zero slip state in response to a zero slip request, controller 10 serving as a zero slip control means executes control to: gradually decrease a target slip amount of lock-up clutch 8 with time; when the target slip amount has reached a slip amount threshold value (a slip detection target slip amount), retain the target slip amount fixed to the slip amount threshold value for a predetermined period of time; and after expiration of the predetermined period of time, gradually decrease the target slip amount from the slip amount threshold value to a zero slip amount with time (FIG. 2).

With this configuration, the lock-up engagement capacity can be controlled to bring lock-up clutch 8 into the zero slip state immediately before slippage occurs by simply controlling the slip amount of lock-up clutch 8.

(2) The slip amount threshold value is set to a slip detection target slip amount that is present in a region immediately before the zero slip state and detectable as the actual slip amount of lock-up clutch 8 by a sensor (see FIG. 3).

With this configuration, during retention of the target slip amount at the slip detection target slip amount, it is possible to control the actual slip amount by sensor detection and the engagement capacity can be controlled to stably hold the zero slip state.

(3) Controller 10 determines that when a condition that the actual slip amount is close to the slip detection target slip amount continues for a predetermined time, the predetermined period of time is expired (step S6 in FIG. 2). With this configuration, upon retaining the target slip amount while fixing the target slip amount to the slip detection target slip amount, the control to gradually decrease the target slip amount toward the zero slip amount is executed after confirming that the movement of lock-up clutch 8 is converged to the stable slip state.

Particularly, it is determined whether or not a condition that the actual slip amount is equal to or larger than the predetermined criterion value that is equal to or smaller than the slip detection target slip amount continues for a predetermined time. Therefore, even under the circumstances as indicated by the dashed line shown in FIG. 3, it is possible to surely confirm that the movement of lock-up clutch 8 is converged to the stable slip state.

(4) Since the second slip amount decrease gradient θ2 in the third stage is set to be smaller than the first target slip amount decrease gradient θ1 in the first stage, it is possible to ensure a response capability with respect to decrease of the target slip amount in the first stage, and after retaining the target slip amount, surely attain the zero slip state with high accuracy in the third stage.

(5) When the oil temperature of the working oil of lock-up clutch 8 is lower than the predetermined value, controller 10 prohibits the zero slip control to bring the target slip amount close to zero after retaining the target slip amount at the slip detection target slip amount for the predetermined period of time (from step S1 to step S2 in FIG. 2).

With this configuration, it is possible to suppress deterioration in controllability of lock-up clutch 8 such as a delay of engagement of lock-up clutch 8 which occurs when the oil temperature is low.

Although the device for controlling an automatic transmission according to the present invention has been explained above by reference to the above embodiment of the present invention, a specific configuration thereof is not limited to the embodiment. Modifications and additional changes in design may be permitted without departing from claims.

In the embodiment, an example of the zero slip control means defines the predetermined period of time during which the target slip amount is retained while being fixed to the slip amount threshold value (slip detection target slip amount), to determine whether or not that the condition that the actual slip amount is equal to or larger than the predetermined criterion value continues for the predetermined time. However, the above-described "predetermined period of time" can be defined in other way. For instance, the target slip amount fixed to the slip amount threshold value may be retained for a preset time previously determined by experiment or the like.

In the embodiment, an example of the slip amount threshold value of the zero slip control means is set to a fixed value that is the slip detection target slip amount. However, the slip amount threshold value of the zero slip control means may be a variable value, for instance, variable depending on engine rotational speed, turbine rotational speed, etc. if the slip amount threshold value of the zero slip control means is a slip amount that is present in the region immediately before the zero slip state and detectable as an actual slip amount of the lock-up clutch by a sensor.

In the embodiment, the device for controlling an automatic transmission of the present invention is applied to an engine vehicle. However, the device for controlling an automatic transmission of the present invention can be applied to a hybrid vehicle equipped with an engine and a motor as drive sources, and other vehicles as long as these vehicles are equipped with a lock-up clutch.

The invention claimed is:

1. A device for controlling an automatic transmission, comprising:
    a torque converter disposed between a drive source of a vehicle and the automatic transmission;
    a lock-up clutch disposed to enable a side of the drive source of the torque converter and a side of the automatic transmission to engage with each other;
    a lock-up clutch control means for executing feedback control to conform an actual slip amount of the lock-up clutch with a target slip amount; and
    a zero slip control means for bringing the lock-up clutch into a zero slip state immediately before slippage occurs in accordance with a zero slip request outputted during a non-gear shift,
    wherein in a case where the target slip amount is equal to or smaller than a slip amount threshold value upon transition to the zero slip state, the zero slip control means executes zero slip control to fix the target slip amount to the slip amount threshold value and retain the fixed target slip amount for a predetermined period of time, and after the predetermined period of time has elapsed, gradually decrease the target slip amount from the slip amount threshold value to a zero slip amount with time.

2. The device for controlling an automatic transmission as claimed in claim 1, wherein after starting the zero slip control, the zero slip control means gradually decreases the target slip amount with a predetermined target slip amount decrease gradient until the target slip amount becomes equal to or smaller than the slip amount threshold value.

3. The device for controlling an automatic transmission as claimed in claim 2, wherein a target slip amount decrease gradient with which the target slip amount is decreased after the predetermined period of time has elapsed is smaller than the predetermined target slip amount decrease gradient with which the target slip amount is decreased to the slip amount threshold value.

4. The device for controlling an automatic transmission as claimed in claim 1, wherein the slip amount threshold value is set to a fine slip amount that is present in a region immediately before the zero slip state and detectable as the actual slip amount of the lock-up clutch by a sensor.

5. The device for controlling an automatic transmission as claimed in claim 1, wherein after fixing the target slip amount to the slip amount threshold value, in a case where a condition that the actual slip amount is equal to or larger than a predetermined criterion value that is equal to or smaller than the slip amount threshold value continues for a predetermined time, the zero slip control means determines that the predetermined period of time has expired.

6. The device for controlling an automatic transmission as claimed in claim 1, wherein in a case where an oil temperature of a working oil of the lock-up clutch is lower than a predetermined value, the zero slip control means prohibits zero slip control to retain the target slip amount at the slip amount threshold value for a predetermined period of time.

* * * * *